Patented May 3, 1927.

1,627,237

UNITED STATES PATENT OFFICE.

JOSEPH G. HARDING, OF JACKSON, OHIO, ASSIGNOR OF ONE-HALF TO WILLIAM R. CASPARIS, OF COLUMBUS, OHIO, AND ONE-HALF TO SAMUEL E. STEPHENSON, OF JACKSON, OHIO.

PROCESS OF MANUFACTURING SLAG CEMENT.

No Drawing.    Application filed January 13, 1923.    Serial No. 612,520.

My invention relates to improvements in process of manufacturing slag cement, and has for its object the production of a cement which not only shall adequately meet standard specifications, but may be made with a minimum of expense.

Slag has long been recognized as a desirable material for the manufacture of cement, but various causes have prevented any considerable commercial production of cement from this material when forming a very large percentage of the total content. Among these I may mention the high and rapidly mounting costs of sintering, the variable chemical constituents of slags and their resistivity to fine grinding or trituration, so that it has been sought to use the slag in much coarser condition than I preferably employ it. Another reason is to be found in the retention of a certain water content where granulated slag is employed, while the proper conditions under which granulation can be effected apparently have not been recognized and worked out before my present invention.

In the first place, I have adopted a process which shall require no sintering of the materials and thereby eliminate a very considerable factor in expense of manufacturing slag cement. Moreover, although granulated slag, which I preferably employ, carries approximately a twenty per cent (20%) water content, I have so arranged the steps in my improved process that practically all of the heating shall be directed toward the elimination of water and secure a perfectly dry basic material for the cement. This I may use in varying proportions ranging from 70 to 90 per cent of the total, and depending upon the character and constituents of the furnace slag in hand.

I have discovered, moreover, that the character of the slag is materially altered not only in the step of granulation, but in the manner in which such granulation is effected, and I preferably flow the slag immediately from the furnaces into an adequate body of cold water, so that the slag is almost instantly chilled and reduced to sizes ranging between that of coarse sand and gravel. Apparently, pre-cooling slag in the air militates against certain structural changes which I believe to take place in the molecular arrangement of the slag materials when they are suddenly cooled from extreme molten temperatures, thereby much better adapting the granulated slag for the purpose of manufacturing cement.

Because of the variable content of the slag and the necessity for strengthening it against fracture, I add to the granulated slag a variable content of raw or burned lime, dependent upon the silica content of said slag. For example, with a silica content of 30 per cent, I add 5 per cent of lime, ranging up to 20 per cent of lime with 40 per cent of silica content. In addition, I supply a content of gypsum approximating 2 per cent of the total weight; this necessarily being maintained at not more than 3 per cent by reason of the high sulphur content in commercial gypsum, which is restricted to 2 per cent in standard specifications for finished Portland cement.

These materials having been assembled, they are passed through a rotary drier, which preferably is lined with fire brick, and extreme care is used to obtain complete dryness, since it is desirable that the slag shall be used immediately following granulation without eliminating water and, accordingly, it is brought from the slag pits with the relatively high water content heretofore referred to.

The materials having been carefully and thoroughly dried, I then add to the mixture a percentage of cement, cement clinker, or Portland cement clinker, ranging up to 13 per cent to make the desired total, after which said mixture is placed in suitable pulverizing mills and ground for about an hour, preferably until more than 80 per cent will pass through a No. 200 sieve. I attach considerable importance to this extremely fine grinding, because it affords more intimate contact and thorough mixture of the various ingredients and permits the maximum effect of the cementitious content when the slag is finally employed.

It should be noted that gypsum is a necessary and desirable low-cost material required for setting the finished cement, but the content thereof at present is limited by standard specification. With a permissible sulphur content of, say 3 per cent, I preferably would increase the added raw or burned gypsum to as much as 5 per cent, although this does not obtain under present conditions. It should further be noted that the slag, limestone and cement contents must be selected and adjusted with respect to each other so that there shall result a magnesia content of not more than 5 per cent because of its weakening effect upon the finished cement or product.

From the foregoing it will readily be appreciated that I have avoided the disadvantages mentioned in the earlier portion of this specification and have outlined a process and produced a cement which contains the maximum of low cost materials. Repeated tests, however, have shown that the slag cement when produced in accordance with the process and under the conditions defined, aequately meets all the standard tests and general and commercial requirements.

Having now described my invention, I claim as new and desire to secure by Letters Patent the following:

1. The herein described process of manufacturing slag cement, which consists in mixing a variable lime content with upward of 70 per cent of undried granulated slag and 3 per cent or less of gypsum, thoroughly drying the mixture and completing the mixture by adding cement clinker approximating 5 per cent or more and thereafter grinding the mixture to extreme fineness and simultaneously mixing the ingredients.

2. The herein described process of manufacturing a non-sintered slag cement, which consists in mixing with a moist water-granulated slag its indicated lime component and approximately 2 per cent of gypsum, thoroughly drying the mixed ingredients, adding approximately 10 per cent of cement clinker, and thereafter grinding and mixing the ingredients to pass approximately upward of 80 per cent through a No. 200 sieve, substantially as set forth.

In testimony whereof I affix my signature.

JOSEPH G. HARDING.